Patented May 6, 1952

2,596,076

UNITED STATES PATENT OFFICE 2,596,076

DITHIOPHOSPHATE ESTERS AS INSECTICIDES

Edwin O. Hook, Old Greenwich, Conn., and Philip H. Moss, Nederland, Tex., assignors to American Cyanamid Company, New York, N. Y., a corporation of Maine No Drawing. Application March 26, 1948, Serial No. 17,393

4 Claims. (Cl. 167—22)

The present invention relates to insecticides, and more particularly to insecticidal compositions containing as a toxic ingredient a dithiophosphate ester of the general formula

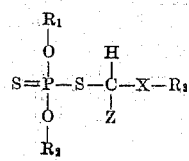

in which $R_1$ and $R_2$ are members of the group consisting of aliphatic hydrocarbon radicals and halogen-substituted aliphatic hydrocarbon radicals, $R_3$ represents an aliphatic hydrocarbon radical, X represents a member of the group consisting of sulfur and oxygen, and Z is a member of the group consisting of hydrogen, alkyl, and aryl radicals.

In the new insecticidal compounds, $R_1$ and $R_2$, being alike or different, represent both the branch and straight chain, the saturated and unsaturated, and the cycloaliphatic hydrocarbon radicals. Typical examples of these radicals are methyl, ethyl, n-propyl, isopropyl, isobutyl, tert.-butyl, n-amyl, sec.-amyl, n-hexyl, 2-ethylhexyl, n-octyl, n-decyl, n-dodecyl, oleyl, cetyl, ceryl, allyl, 2-chloroallyl, cyclohexyl, bromomethyl, and 2-chloroethyl.

The esters utilized in this invention may be prepared by reacting together an aliphatic alcohol or mercaptan, an aldehyde, and a dialkyl ester of dithiophosphoric acid. A typical reaction in which tertiary butyl mercaptan, formaldehyde, and diethyl dithiophosphoric acid are reacted together to produce S-tert.-butylmercaptomethyl O,O-diethyl dithiophosphate may be illustrated as follows:

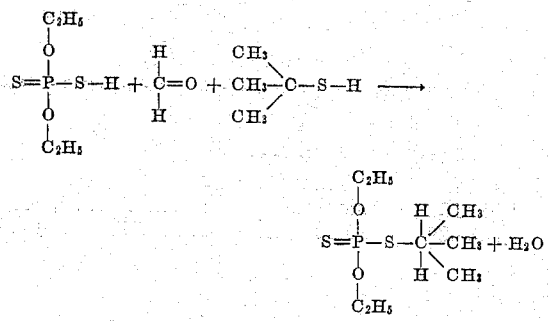

Aldehydes which may be utilized in the preparation of the insecticidal compounds include formaldehyde, acetaldehyde, propionic aldehyde, butyric aldehyde, cinnamic aldehyde, benzaldehyde, and the like. For instance, in the above general formula, when acetaldehyde is employed in the process the symbol Z becomes methyl, and when benzaldehyde is employed Z becomes the phenyl radical.

These compounds are high-boiling liquids substantially insoluble in water, but soluble in many organic liquids including the ketones, namely, acetone, cyclohexanone, isophorone, methyl ethyl ketone, and the like; the monohydric aliphatic alcohols; various esters, namely, the acetates, phthalates, abietates, fumarates, maleates, and the like; ether alcohols such as the polyethylene glycols; ketone-alcohols such as diacetone alcohol; polymethylated naphthalenes; animal and vegetable oils, and petroleum oils.

The term "carrier" as used hereinafter means a vehicle used to transport the toxic agent to the insect to be destroyed. Such carriers may be solids, liquids, or gases. For instance, solids such as various clays, talcs, diatomaceous earths, fuller's earths, pyrophyllites, cellulosic sheets, sawdust, and the like, may carry the toxic agent through absorption or adsorption with or without the assistance of a solvent or non-solvent carrier. Liquid carriers may be classed as solvents and non-solvents for the organic dithiophosphates. The non-solvents will, of course, require a minor proportion of an emulsification agent to thoroughly distribute the toxic agent through the carrier. Under such circumstances any well-known inert emulsification agent may be used in, say, a proportion of from 1% to 10%, such as the polyethylene glycol, sorbitol, mannitol, and pentaerythritol laurates. Such solvent carriers may be the phthalate, fumarate, maleate, acetate, and naphthenate esters, the monohydric aliphatic alcohols, the polyethylene glycols, ketones, aromatic hydrocarbons such as benzene, toluene, xylene, and the polymethylated naphthalenes, ketone-alcohols, animal and vegetable oils such as the soybean, cottonseed, linseed, peanut, tallow, and the partial and completely hydrogenated products, and petroleum hydrocarbons such as petroleum ether, kerosene, and the refined spray oils or mixtures thereof. In some cases a combination of solvent and non-solvent carrier may be used, the solvent and non-solvent being miscible. Since some of the organic dithiophosphates are soluble in water to the extent of about 10 p. p. m., water alone may be used as the carrier at or above that dilution. Gaseous carriers may be air, nitrogen, carbon dioxide, methyl chloride, difluorodichloromethane, and the like.

The marked activity of the organic dithiophosphates in controlling various insects is illustrated as follows:

*Aphis rumicis*—Spray solutions were prepared by dissolving the dithiophosphate compounds in a solvent carrier consisting of 65% acetone and 35% water. The following table shows the kills obtained for the various dilutions when the sprays were applied to black bean aphids feeding on nasturtium plants.

| Compound | Dilution | Percent Kill |
|---|---|---|
| S-tert.-butylmercaptomethyl O,O-diethyl dithiophosphate. | 1-100,000 | 100. |
| S-tert.-butylmercaptomethyl O,O-diethyl dithiophosphate. | 1-500,000 | 98.3 |
| S-tert.-butylmercaptomethyl O,O-diethyl dithiophosphate. | 1-1,000,000 | 72.0 |
| S-tert.-butylmercaptomethyl O,O-bis (2-chloroethyl) dithiophosphate. | 1-500,000 | 100. |
| S-tert.-butylmercaptomethyl O,O-dimethyl dithiophosphate. | 1-10,000 | 100. |
| S-tert.-butylmercaptomethyl O,O-dimethyl dithiophosphate. | 1-100,000 | 97.0 |
| S-tert.-butylmercaptomethyl O,O-di-n-propyl dithiophosphate. | 1-100,000 | 100. |
| S-tert.-butylmercaptomethyl O,O-di-n-propyl dithiophosphate. | 1-500,000 | 83.5 |
| S-tert.-butylmercaptomethyl O,O-di-n-butyl dithiophosphate. | 1-10,000 | 96.2 |
| S-sec.-amylmercaptomethyl O,O-diethyl dithiophosphate. | 1-10,000 | 100. |
| S-sec.-amylmercaptomethyl O,O-diethyl dithiophosphate. | 1-100,000 | 99.6 |
| S-tert.-heptylmercaptomethyl O,O-diethyl dithiophosphate. | 1-10,000 | 100. |
| S-tert.-heptylmercaptomethyl O,O-diethyl dithiophosphate. | 1-100,000 | 99.0 |
| S-tert.-heptylmercaptomethyl O,O-diethyl dithiophosphate. | 1-500,000 | 68.0 |
| S-tert.-heptylmercaptomethyl O,O-bis(2-chloroethyl) dithiophosphate. | 1-10,000 | 99.0 |
| S-tert.-heptylmercaptomethyl O,O-bis (2-chloroethyl) dithiophosphate). | 1-100,000 | 83.0 |
| S-n-octylmercaptomethyl O,O-diethyl dithiophosphate. | 1-10,000 | 100. |
| S-n-octylmercaptomethyl O,O-diethyl dithiophosphate. | 1-100,000 | 76.3 |
| S-tert.-dodecylmercaptomethyl O,O-dimethyl dithiophosphate. | 1-10,000 | 96.0 |
| S-tert.-dodecylmercaptomethyl O,O-diethyl dithiophosphate. | 1-10,000 | 97.0 |
| S-ethoxymethyl O,O-diisopropyl dithiophosphate. | 1-10,000 | 94.0 |
| S-tert.-butoxymethyl O,O-di-n-propyl dithiophosphate. | 1-10,000 | 99.9 |
| S-n-butoxymethyl O,O-diethyl dithiophosphate. | 1-10,000 | 79.5 |
| S-tert.-butoxymethyl O,O-diethyl dithiophosphate. | 1-10,000 | 84.0 |
| S-n-butoxymethyl O,O-bis (2-chloroethyl) dithiophosphate. | 1-10,000 | 99.0 |

*Tribolium confusum.*—80–100% kill in 24 hours with S-tert.-butylmercaptomethyl O,O-diethyl dithiophosphate, S-tert.-butylmercaptomethyl O,O-bis(2-chloroethyl) dithiophosphate, S-tert.-butylmercaptomethyl O,O-di-n-propyl dithiophosphate, S-sec.-amylmercaptomethyl O,O-diethyl dithiophosphate, S-tert.-heptylmercaptomethyl O,O-diethyl dithiophosphate, S-tert.-butylmercaptomethyl O,O-di-n-butyl dithiophosphate, and S-tert.-butylmercaptomethyl O,O-dimethyl dithiophosphate in concentrations of 0.1–1.0% adsorbed on solid carriers such as pyrophyllite, attapulgus clay, and fuller's earth.

*German cockroach.*—90–100% kill in 24 hours with S-n-octylmercaptomethyl O,O-diethyl dithiophosphate, S-sec.-amylmercaptomethyl O,O-diethyl dithiophosphate, S-tert.-butylmercaptomethyl O,O-di-n-propyl dithiophosphate, S-tert.-butylmercaptomethyl O,O-diethyl dithiophosphate, S-tert.-heptylmercaptomethyl O,O-diethyl dithiophosphate, S-tert.-butylmercaptomethyl O,O-bis(2-chloroethyl) dithiophosphate, and S-tert.-butoxymethyl O,O-di-n-propyl dithiophosphate in concentrations of 0.1–1.0% adsorbed on solid carriers such as talc, pyrophyllite, and attapulgus clay.

The dithiophosphate esters may also be employed in controlling the green peach aphid, pea aphid, chrysanthemum aphid, greenhouse thrips, California red scale, citrus red spider, greenhouse red spider, milkweed bug, mealy bug, sow bug, Southern army worm, yellow fever mosquito, malarial mosquito, Mexican bean beetle, and black carpet beetle.

These new insecticidal compounds may also be used in combination with insecticides such as lead arsenate, nicotine, rotenone, pyrethrum, benzene hexachloride, 1,1 - di(p-chlorophenyl)-2,2,2-trichloroethane, dodecyl thiocyanate, phenothiazine, and the like; with fungicides such as sulfur, various copper compounds, mercury salts, and the like; and with various types of plant foods and fertilizers.

Further details regarding the preparation of the esters utilized in this invention are given in copending application Serial No. 17,396, filed concurrently herewith and now Patent No. 2,586,655.

While the invention has been described with particular reference to specific embodiments, it is to be understood that it is not to be limited thereto, but is to be construed broadly and restricted solely by the scope of the appended claims.

We claim:

1. An insecticidal composition containing as a toxic ingredient S-tert.-butylmercaptomethyl O,O-diethyl dithiophosphate, and a carrier.

2. An insecticidal composition containing as a toxic ingredient S-tert.-butylmercaptomethyl O,O-bis(2-chloroethyl) dithiophosphate, and a carrier.

3. An insecticidal composition containing as a toxic ingredient S-tert.-butylmercaptomethyl O,O-di-n-propyl dithiophosphate, and a carrier.

4. An insecticidal composition containing as a toxic ingredient a dithiophosphate ester of the general formula

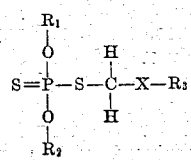

in which $R_1$ and $R_2$ are members of the group consisting of alkyl and chlor-substituted alkyl radicals having not more than four carbon atoms, $R_3$ represents an aliphatic hydrocarbon radical, X represents a member of the group consisting of sulfur and oxygen, and a carrier.

EDWIN O. HOOK.
PHILIP H. MOSS.

REFERENCES CITED

The following references are of record in the file of this patent:

UNITED STATES PATENTS

| Number | Name | Date |
|---|---|---|
| 1,939,951 | Buchanan | Dec. 19, 1933 |
| 2,063,629 | Salzberg et al. | Dec. 8, 1936 |